2,841,784
PILOT PULSE DUAL CHANNEL GAIN CONTROL

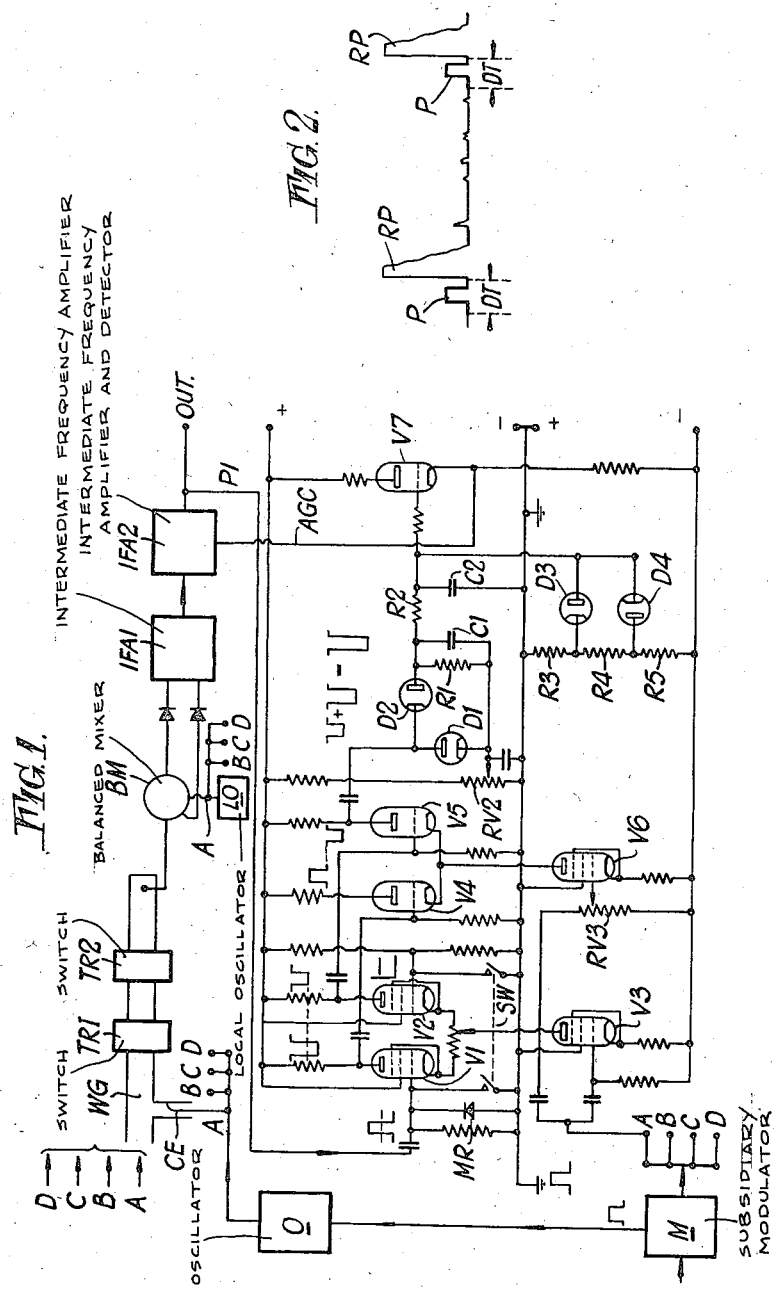

Alfred Benjamin Starks-Field, Chelmsford, Oswold Edward Keall, West Hanningfield, and Eric Holden Priestley, Leigh-on-Sea, England, assignors to Marconi's Wireless Telegraph Company Limited, London, England, a British company Application March 29, 1954, Serial No. 419,288

Claims priority, application Great Britain April 1, 1953

2 Claims. (Cl. 343—17.1)

This invention relates to radar systems and more specifically to such systems of the kind in which energy reflected from a target is received on more than one aerial channel, i. e. of the kind in which there is a plurality of receiver channels. In such systems the outputs from the various receiver channels are usually combined or compared in order to extract the required information. It is therefore usually required that the gains in the separate receiver channels shall have and retain some predetermined relationship one to another—usually, though not necessarily, the relationship of equality. The present invention seeks to provide improved and simple means for automatically controlling channel gain in a radar system of the kind referred to in such manner that for equal signal strengths at predetermined points in the channels the signal strengths at later predetermined points therein shall be of predetermined relative values, usually all equal. The outputs from the channels may be of any nature depending upon the design of the radar system as a whole but for simplicity in description it will hereinafter be assumed that video outputs are in question.

A typical radar system of the kind referred to may employ two or more receiving aerials each constituting the input point to a channel and the separate channels between each aerial and the final utilization point normally includes a good deal of apparatus whose gain or attenuation (these terms are employed herein as synonymous, attenuation being only gain of less than unity) is liable to vary with time. Such apparatus may include one or more so-called transmit-receive (T–R) cells or gas switches, a mixer with so-called crystal valves, and amplifier valves. Over long periods of time the gain of these and other items of apparatus may change—by 10 db or more—while even in short periods small but important changes may occur. All these changes and others which may be present produce the result that, over a period of time, the gains of the separate receiver channels change and even if they are carefully adjusted to equality at the beginning of a period of time they may be substantially away from equality at the end of such period. It is very inconvenient to maintain a close measuring, or instrumental watch on the gains of the various channels and to make adjustment at frequent intervals in order to avoid relative gain changes and the present invention provides apparatus whereby a required inter-channel gain relationship can be maintained automatically.

According to this invention a radar system of the kind referred to comprises means for feeding a pulse of signals into a predetermined point of a receiver channel during a short period in the so-called "dead time" prior to the transmission of a radar pulse, means for taking off said pulse of signals from said channel after passage through the part of said channel whose gain is to be automatically controlled, means for comparing the pulse of signals thus taken off with a reference signal and means for utilizing the resultant of the comparison for automatically controlling the gain of said channel to maintain it at a predetermined value.

Preferably the pulse of signals is injected into the receiver channel at the extreme input end thereof i. e. at the point at which signals received upon the associated receiving aerial are fed thereto.

The signals of said pulse of signals may be of received signal frequency or (in the case of a heterodyne receiver) they may be of image frequency.

Preferably the reference signal is a constant D. C. signal which is compared with a D. C. signal obtained by rectifying the pulse of signals after passage through the appropriate portion of the receiver channel.

The invention is illustrated in the accompanying drawing in which:

Fig. 1 is a diagram partly in block form and partly in circuit form of a preferred embodiment of my invention; and Fig. 2 is an explanatory graphical curve diagram.

The circuit form portion of Fig. 1 shows in some detail a preferred form of control unit employed in carrying out the invention but other forms of control units may be used.

Referring to Fig. 1 this shows a single receiver channel of a radar system of the kind referred to and having a plurality of receiver channels, four such channels being indicated by the letters A, B, C and D being indicated. The apparatus of only one channel is shown but it will be understood that the others are similar and corresponding points in the four channels are indicated by the letters A, B, C, and D in several places.

Received echo signals picked up by four receiving aerials (not shown) are fed into each of the four channels, the incoming signals being represented by arrows marked A, B, C and D, the apparatus for the channel A only being shown. These signals of channel A appear in a wave guide WG containing two T. R. cells (gas switches) TR1, TR2. The signals then pass to a balanced mixer—preferably a so-called rat-race type of mixer—indicated at BM with which is associated a heterodyne local oscillator LO. The resultant intermediate frequency is amplified in two intermediate frequency amplifiers IFA1 and IFA2 in cascade, the output from the last amplifier which includes a detector being taken off at "out" to video signal utilization means (not shown) of any suitable well known type.

A synchronizing pulse is taken from the master pulse generator (not shown) of the radar system and applied to a subsidiary modulator M the output from which is a short pulse, for example of 30 micro-seconds duration, which is delayed so as to appear in the so-called "dead time" of the system e. g. during the fly-back period preceding each transmitted radar pulse. This is conventionally indicated in Fig. 2 in which P represents the pulse from the modulator M in time relation to the transmitted radar pulse RP. The "dead time" in Fig. 2 is represented at DT.

Pulse output from the modulator M is used to control an oscillator O which may operate at the signal frequency of the radar system or at the image frequency i. e. a frequency as much on the other side of the frequency from the local oscillator LO as the signal frequency is on one side. The arrangement is such that the oscillator O delivers oscillations only during the presence of a pulse P from the modulator. The pulse of oscillations thus produced is fed into the receiver channel at the input end of the portion thereof whose gain is to be controlled. As shown in Fig. 1 this pulse of oscillations is fed in at the extreme input end in advance of the gas switches TR1 and TR2 by means of a loop, probe, or directional coupler, a coupling element CE being indicated as provided for this purpose.

The pulse from the modulator M is also fed to control that part of the apparatus herein termed the control unit which is shown in circuit diagram form in Fig. 1. This unit receives a gating input constituted by the pulse input from M and a video signal input taken from the output end of the amplifier IFA2. It provides over the lead marked AGC a gain controlling potential which automatically controls, in manner well known per se, the gain of a valve or valves in the amplifier IFA2.

Output from the amplifier IFA2 is fed over the lead P1 to the control grid of a valve V1. This valve is one of a pair of valves V1, V2 whose cathodes are connected together through the resistance of a balancing potentiometer RV1 the adjustable tap on which is connected to the anode of a valve V3. A reference signal which may be a pulse coincident in time with the pulse P but is more conveniently a steady positive bias derived from a suitable stabilized source, is applied to the control grid of the valve V2. The pulse P from the modulator M is also applied to the control grid of the valve V3 and through an adjustment potentiometer RV3 to the control grid of another valve V6. The valves V3 and V6 are so adjusted as to have zero anode current except when a pulse P is present at their control grids at which times anode currents flow therein. Consequently the valves V1, V2 are non-conducting except when a pulse P is present. The pulse P therefore operates as a gating pulse and except during the gating periods valves V1 and V2 will be non-conducting while during gating periods their anode potentials will fall to an extent determined by the voltages at their respective grids. A double pole switch SW in conjunction with the potentiometer RV1 aids in balancing two valves V1 and V2. The changes in anode potentials of the valves V1 and V2 are fed to the respective control grids of two further valves V4, V5 which have their cathodes connected together, the common cathode point being taken to the anode of the valve V6 already referred to. As already explained V6, like V3 is a gating valve. When the valve V6 is conducting the combination constituted by the valves V4, V5 and V6 acts as a difference amplifier so far as the voltages on the grids of valves V4 and V5 are concerned, the anode potentials of the said valves V4 and V5 remaining constant so long as equal amplitude signals are applied to their control grids i. e. so long as the signals on the grids of valves V1 and V2 are equal during conducting periods of the gating valve V3. In unequal signals appear on the grids of the valves V4 and V5, voltages proportional to their differences will appear on the anodes of the said valves these voltages being equal in amplitude but opposite in phase. It will be apparent that a negative pulse will appear at the anode of the valve V5 when the valve V6 conducts during a gating period and this negative pulse will have superimposed upon it any difference signal that is present. The sense of the video signal fed over lead P1 to the grid of valve V1 is here assumed to be positive and if this exceeds the reference voltage at the grid of valve V2—as will happen if the gain between the point CE and lead P1 is more than it should be—a negative pulse will be superimposed at the anode of valve V5 upon the negative pulse due to the gating valve V6. The voltage at the anode of the valve V5 is fed through a diode D2 to charge the condenser C1 in a resistance-capacity network R1, C1 the diode D1 acting as a clamp. Further smoothing is provided by the resistance-capacity network R2, C2 and the smoothed voltage at the output thereof is applied to the control grid of a cathode follower valve V7. The initial bias adjustment of the cathode follower valve V7 is negative with respect to earth and is applied over the lead AGC as gain controlling bias to one or more of the valves incorporated in the amplifier IFA2. Thus any increase in gain between the point CE and the lead P1 will result in an increase in the negative bias fed over the lead AGC and thus tend to restore the gain to its correct value. Similarly a decrease in gain between the point CE and the lead P1 will produce a decrease in the negative bias over the lead AGC. The whole system therefore operates to maintain the gain such that the signal output over lead P1 to the control grid of valve V1 balances the reference signal applied to the control grid of the valve V2.

Since the initial bias for the controlled valves in the amplifier IFA2 is derived mainly from the smoothed pulses from the control unit, it is convenient to reduce to a low value or to eliminate altogether the cathode bias resistors (not shown) normally associated with the controlled valves.

The diodes D3 and D4 associated with the potentiometer constituted by the resistances R3, R4 and R5 are for the purpose of preventing the control grid voltage of the valve V7 from falling outside limits set by the biassing potentials derived from the said potentiometer R3, R4, R5.

In Fig. 1 pulse indications are shown at various points in the circuit, the combined pulse made up of the gating pulse and what may be termed the "difference" pulse being represented as the sum of two pulses just above the diode D2. The reference signal indicated as a steady positive potential is conventionally represented alongside the valve V2.

We claim:

1. A radar system comprising a receiver channel, means for feeding a pulse of signals into a predetermined point of said receiver channel during a short period in the so-called "dead time" prior to the transmission of a radar pulse, means for taking off said pulse of signals from said channel after passage through the part of said channel whose gain is to be automatically controlled, comparing means for comparing the pulse of signals thus taken off with a reference signal, means for utilizing the resultant of the comparison for automatically controlling the gain of said channel to maintain it at a predetermined value, a gating valve having at least a control grid, a cathode and a plate, said gating valve operating to control said comparing means and being inoperative except when a pulse of signals is fed into said channel, and comprising generator means for producing pulses synchronized with the transmitted pulse to appear in the "dead time," an oscillator connected to be controlled by the said synchronized pulses to feed pulses of oscillations into said predetermined point of said receiver channel whenever said oscillator receives a synchronized pulse from said generator means, means for feeding the synchronized pulses to the control of said gating valve, and wherein the control grid of said gating valve is biased to render said gating valve inoperative except when a pulse of signals is being fed into said channel, and wherein the comparing means for comparing the pulse of signals comprises a first valve having a control grid, a cathode and an anode where said control grid is connected to receive the taken-off signals, and a second valve having a control grid, a cathode and an anode, where the said last mentioned control grid is connected to receive the reference signal, a cathode circuit for said first and second valves and wherein the gating valve is connected in series in the cathode circuit of each of said first and second valves, and further including a master generator and a subsidiary modulator controlled by synchronizing pulses from said master pulse generator to produce a pulse which is delayed to appear in the "dead time," a local oscillator being controlled by the subsidiary modulator to feed said pulse of signals into said predetermined point whenever said oscillator receives a pulse from the subsidiary modulator.

2. A radar system comprising a receiver channel, means for feeding a pulse of signals into predetermined point of said receiver channel during a short period in the so-called "dead time" prior to the transmission of a radar pulse, means for taking off said pulse of signals from said channel after passage through the part of said channel whose gain is to be automatically controlled, comparing means for comparing the pulse of signals thus taken off with a reference signal, means for utilizing the resultant of the comparison for automatically controlling the gain of said channel to maintain it at a predetermined value, a gating valve having at least a control grid, a cathode and a plate, said gating valve operating to control said comparing means and being inoperative except when a pulse of signals is fed into said channel, and comprising generator means for producing pulses synchronized with the transmitted pulse to appear in the "dead time," an oscillator connected to be controlled by the said synchronized pulses to feed pulses of oscillations into said predetermined point of said receiver channel whenever said oscillator receives a synchronized pulse from said generator means, means for feeding the synchronized pulses to the control grid of said gating valve, and wherein the comparing means for comparing the pulse of signals comprises a first valve having at least a cathode, an anode and a control grid, said control grid being connected to receive the taken-off signals, and a second valve having at least a cathode, an anode and a control grid, said last mentioned control grid being connected to receive the reference signal, a cathode circuit for said first and second valves and wherein the gating valve is connected in series in said cathode circuit a modulator associated with said generator means, the comparing means for comparing the pulse of signals also comprising a further gating valve connected to receive pulses from the modulator to conduct only when such pulses are received, and difference amplifier controlled by the further gating valve to operate only when the latter conducts, the anodes of the first and second valves being connected to the difference amplifier and the difference amplifier being arranged to produce an output proportional to the difference of the voltages on the anodes of said first and second valves and further comprising a master pulse generator and a subsidiary modulator controlled by synchronizing pulses from said master pulse generator to produce a pulse which is delayed to appear in the "dead time."

References Cited in the file of this patent

UNITED STATES PATENTS

| | | |
|---|---|---|
| 2,538,028 | Mozeley | Jan. 16, 1951 |
| 2,552,527 | Dean | May 15, 1951 |
| 2,751,587 | Tasker | June 19, 1956 |

FOREIGN PATENTS

| | | |
|---|---|---|
| 581,921 | Great Britain | Oct. 30, 1946 |